US007979789B2

(12) United States Patent
Ammerlaan et al.

(10) Patent No.: US 7,979,789 B2
(45) Date of Patent: Jul. 12, 2011

(54) SYSTEM AND METHOD OF REPLACING A DELEGATE COMPONENT ASSOCIATED WITH A DELEGATE MODULAR SOFTWARE COMPONENT AT SOFTWARE EXECUTION TIME

(75) Inventors: Michael H Ammerlaan, Sammamish, WA (US); Peter Harwood, Snoqualmie, WA (US); Rajesh Kamath, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 967 days.

(21) Appl. No.: 11/311,745

(22) Filed: Dec. 19, 2005

(65) Prior Publication Data

US 2007/0168961 A1    Jul. 19, 2007

(51) Int. Cl.
*G06F 17/22* (2006.01)

(52) U.S. Cl. ...................................................... 715/234

(58) Field of Classification Search .................. 715/744, 715/774, 733, 234
See application file for complete search history.

(56) References Cited

U.S. PATENT DOCUMENTS

| | | | | |
|---|---|---|---|---|
| 5,572,643 | A | 11/1996 | Judson | 709/218 |
| 5,586,235 | A | 12/1996 | Kauffman | 715/202 |
| 6,026,433 | A | 2/2000 | D'Arlach et al. | 709/217 |
| 6,093,215 | A * | 7/2000 | Buxton et al. | 717/107 |
| 6,134,559 | A | 10/2000 | Brumme et al. | 707/103 R |
| 6,304,886 | B1 | 10/2001 | Bernardo et al. | 715/234 |
| 6,343,377 | B1 * | 1/2002 | Gessner et al. | 717/171 |
| 6,469,714 | B2 * | 10/2002 | Buxton et al. | 715/762 |
| 6,601,057 | B1 * | 7/2003 | Underwood et al. | 707/1 |
| 6,601,233 | B1 * | 7/2003 | Underwood | 717/102 |
| 6,622,168 | B1 | 9/2003 | Datta | 709/219 |
| 6,684,369 | B1 * | 1/2004 | Bernardo et al. | 715/205 |
| 6,697,825 | B1 * | 2/2004 | Underwood et al. | 715/207 |
| 6,845,503 | B1 * | 1/2005 | Carlson et al. | 717/166 |
| 6,910,208 | B1 | 6/2005 | Zimniewicz | 717/174 |
| 6,931,599 | B1 * | 8/2005 | Korenshtein | 715/762 |
| 6,981,250 | B1 | 12/2005 | Wiltamuth et al. | 717/170 |
| 7,039,658 | B2 * | 5/2006 | Starkey | 707/203 |
| 7,047,318 | B1 | 5/2006 | Svedloff | 709/246 |
| 7,047,463 | B1 * | 5/2006 | Organ et al. | 714/724 |
| 7,152,207 | B1 | 12/2006 | Underwood et al. | 715/207 |

(Continued)

FOREIGN PATENT DOCUMENTS

WO    WO 2005/062201 A1    7/2005

OTHER PUBLICATIONS

Moro et al., A Version Model for Supporting Adaption of Web Pages, ACM, WIDM '04, Nov. 12-13, 2004, pp. 123-125.*

(Continued)

*Primary Examiner* — Laurie Ries
*Assistant Examiner* — Frank D Mills
(74) *Attorney, Agent, or Firm* — Merchant & Gould

(57) ABSTRACT

A method of replacing a delegate component associated with a delegate modular software component ("associate delegate component") at software execution time, the method comprising obtaining a delegate modular software component identifier; selecting one of a plurality of candidate modular software components having a higher priority level than other of the plurality of candidate modular software components, wherein the one of the plurality of candidate modular software components has the same identifier as the delegate modular software component identifier; and replacing the associate delegate component with the one of the plurality of candidate modular software components during the execution of software including the delegate modular software component.

20 Claims, 4 Drawing Sheets

U.S. PATENT DOCUMENTS

| | | | |
|---|---|---|---|
| 7,269,664 B2* | 9/2007 | Hutsch et al. | 709/246 |
| 7,448,022 B1* | 11/2008 | Ram et al. | 717/120 |
| 7,558,857 B2 | 7/2009 | Ammerlaan et al. | 709/226 |
| 7,577,661 B2 | 8/2009 | Bankston et al. | 707/9 |
| 7,619,761 B2 | 11/2009 | Bankston et al. | 358/1.14 |
| 7,640,328 B1* | 12/2009 | Lele | 709/223 |
| 2002/0038256 A1 | 3/2002 | Nguyen | 705/26 |
| 2002/0049788 A1* | 4/2002 | Lipkin et al. | 707/513 |
| 2002/0069327 A1 | 6/2002 | Chauvel | 711/130 |
| 2002/0083097 A1* | 6/2002 | Warrington | 707/513 |
| 2003/0014442 A1* | 1/2003 | Shiigi et al. | 707/513 |
| 2003/0074634 A1* | 4/2003 | Emmelmann | 715/513 |
| 2003/0126202 A1* | 7/2003 | Watt | 709/203 |
| 2003/0140143 A1* | 7/2003 | Wolf et al. | 709/225 |
| 2003/0172129 A1 | 9/2003 | Moses et al. | 709/219 |
| 2003/0225853 A1 | 12/2003 | Wang et al. | 709/217 |
| 2004/0015476 A1* | 1/2004 | Twaddle | 707/1 |
| 2004/0046789 A1* | 3/2004 | Inanoria | 345/748 |
| 2004/0068714 A1* | 4/2004 | Deimel et al. | 717/101 |
| 2004/0103073 A1 | 5/2004 | Blake | 707/1 |
| 2004/0103433 A1 | 5/2004 | Regeard | 725/53 |
| 2004/0128618 A1 | 7/2004 | Datta | 715/234 |
| 2004/0148565 A1* | 7/2004 | Davis et al. | 715/501.1 |
| 2004/0168123 A1 | 8/2004 | Lomelin-Stoupignan et al. | 715/513 |
| 2004/0168153 A1* | 8/2004 | Marvin | 717/120 |
| 2004/0205572 A1 | 10/2004 | Fields et al. | 715/513 |
| 2004/0216084 A1* | 10/2004 | Brown et al. | 717/102 |
| 2004/0268228 A1* | 12/2004 | Croney et al. | 715/505 |
| 2005/0005261 A1* | 1/2005 | Severin | 717/108 |
| 2005/0015357 A1* | 1/2005 | Shahidi | 707/1 |
| 2005/0071758 A1* | 3/2005 | Ehrich et al. | 715/513 |
| 2005/0075115 A1* | 4/2005 | Corneille et al. | 455/456.3 |
| 2005/0102284 A1 | 5/2005 | Srinivasan | 707/4 |
| 2005/0149549 A1* | 7/2005 | Jaspers et al. | 707/102 |
| 2005/0187895 A1 | 8/2005 | Zimniewicz | 707/1 |
| 2006/0080336 A1* | 4/2006 | Zhang et al. | 707/100 |
| 2006/0129516 A1* | 6/2006 | Bradford et al. | 707/1 |
| 2006/0161895 A1* | 7/2006 | Speeter et al. | 717/121 |
| 2007/0061705 A1 | 3/2007 | Ammerlaan et al. | 715/205 |
| 2007/0076228 A1* | 4/2007 | Apelbaum et al. | 358/1.1 |
| 2008/0120600 A1* | 5/2008 | Deimel et al. | 717/121 |

OTHER PUBLICATIONS

Fiala et al., Design and Implementation of Component-based Adaptive Web Presentations, ACM, SAC '04, Mar. 14-17, 2004, pp. 1699-1700.*

"Towards a Dynamic CORBA Component Platform; Abstract", 2000, IEEE Computer Society, http://portal.acm.org/citation.cfm?id=557137.790812, (2 pages).

Introduction to the PlaceHolder Web Server Control, 2005 Microsoft Corporation, http://msdn.microsoft.com/library/default.asp?url=/library/en-us/vbcon/html/vbconplaceholderwebservercontrol.asp, (1 page).

Office Action mailed Jun. 3, 2010, in co-pending U.S. Appl. No. 11/224,678.

Office Action mailed Jan. 27, 2010, in co-pending U.S. Appl. No. 11/224,678.

Office Action mailed Aug. 5, 2009, in co-pending U.S. Appl. No. 11/224,678.

Office Action mailed Jan. 7, 2009, in co-pending U.S. Appl. No. 11/224,678.

Office Action mailed Nov. 4, 2010, in co-pending U.S. Appl. No. 11/224,678.

Office Action mailed Mar. 25, 2011, in co-pending U.S. Appl. No. 11/224,678.

* cited by examiner

SYSTEM AND METHOD OF REPLACING A DELEGATE COMPONENT ASSOCIATED WITH A DELEGATE MODULAR SOFTWARE COMPONENT AT SOFTWARE EXECUTION TIME

BACKGROUND

Web provisioning software has been developed to build Web sites for the Internet and intranets. Web provisioning generally includes selecting a site template that defines the structure and the content of a Web site. Based on the content of the site template, Web provisioning software populates the initial page, the directories, and the site structures of the Web site. Web provisioning software enables a user to create multiple Web sites from a single, predefined site template. As a result, predefined site templates enable a user to quickly create Web sites without spending a substantial amount of time deciding how the sites should look or function.

In some platforms suitable for Web provisioning, such as Microsoft Windows SharePoint Services®, a Web site can only use provisioning information from the site template that initially provisioned the Web site. While the site template serves as a foundation, the site template limits the functionalities that can be added to the provisioned Web site. The Web site is constrained to the set of functionalities included in the site template. The Web site cannot be modified to support functionalities different from the functionalities provided by the site template. Given that business requirements for a Web site may change from time to time, a Web site may be required to evolve during its lifetime. Part of the evolution may require that the Web site functionalities change. Many types of Web page functionalities are provided by control components ("controls"). Controls are active Web page components that respond to user input requesting the performance of specific tasks, such as the selection of an option, text entry, or search. Controls are modular in nature with well-defined interfaces and may be used in many different Web pages that require the same functionality. The behavior and appearance of Web page controls may be specified using properties. Setting the properties of a control to a predefined value causes the control to appear or behave in certain predefined manners. For example, a property of a control may specify the size of the control. Another property of the control may specify certain default behavior of the control, such as showing a default selection of an item in a list presented by the control to a user. Customizing a Web page to fit a particular need often requires using custom control components.

Web site provisioning software makes it easy to create new Web sites to match end-user needs. However, the large number of Web sites created using such software can create new manageability and extensibility problems. For example, third party Web applications may need to globally replace certain sections or components of a Web page with the third party's own custom section or component. For instance, a third party provider of a search application may want to replace a standard search application component with a more advanced search application component that features more capabilities and better user interface elements. Typically, replacing a standard search application requires that the advanced search application provider modify each instance of a page that contains the standard search application. Because of the large number of Web pages included in many Web sites, this process can be time-consuming and is often error-prone.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Disclosed is the replacement of a delegate component associated with a delegate modular software component, i.e., an associate delegate component, at software execution time. In one exemplary form, the replacement comprises: obtaining a delegate modular software component identifier; selecting one of a plurality of candidate modular software components having a higher priority level than other of the plurality of candidate modular software components, wherein the one of the plurality of candidate modular software components has the same identifier as the delegate modular software component identifier; and replacing the associate delegate component with the one of the plurality of candidate modular software components during the execution of software including the delegate modular software component.

In another exemplary form, the replacement comprises: obtaining a delegate modular software component identifier; selecting one of a plurality of candidate modular software components having a higher priority level than other of the plurality of candidate modular software components and a scope, wherein the one of the plurality of candidate modular software components has the same identifier as the delegate modular software component identifier; and replacing the associate delegate component with the one of the plurality of candidate modular software components during the execution of software including the delegate modular software component, the software including the delegate modular software component having a scope of execution within a hierarchical computing system, the scope of execution being associated with the scope of the one of a plurality of candidate modular software components.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

A system and method for customizing control components on a Web page are described. While the system and the method are suited for customizing control components in a Web page, the system and method may also find use in other software environments where modular software components are used. Thus, it is to be understood that the present invention should not be construed as limited in application to the exemplary embodiments described herein, and such exemplary embodiments should not be construed as limiting.

Figure 1:
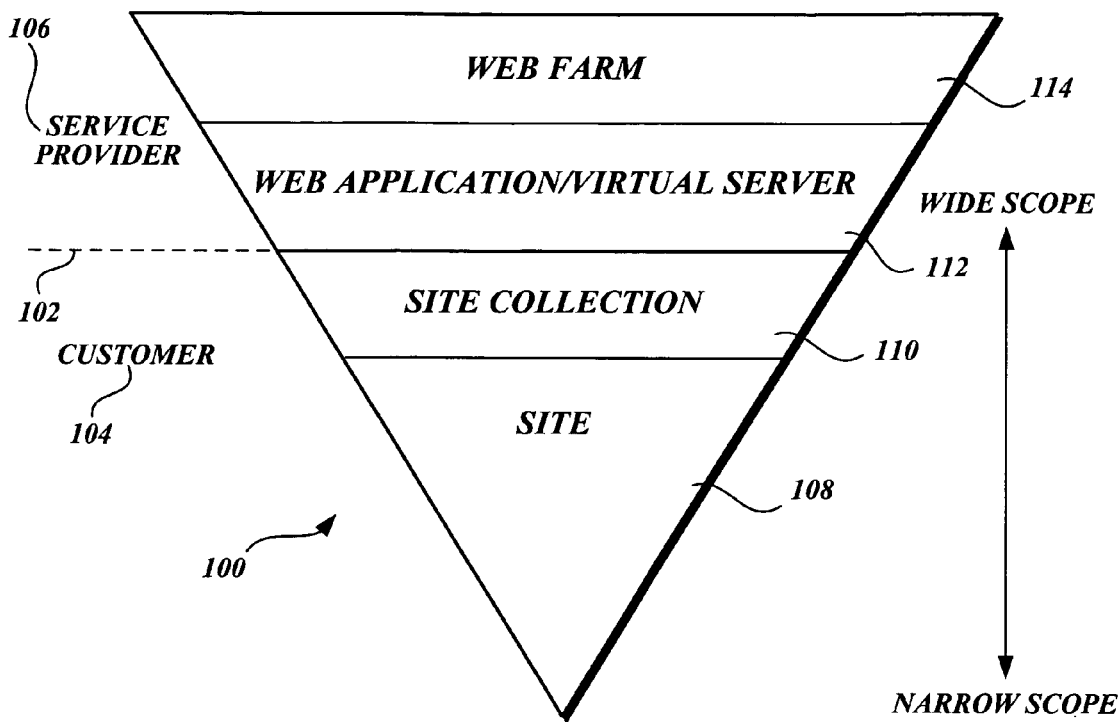
FIG. 1 is a pictorial diagram of an exemplary architecture of Web servers.

Web pages are often part of a hierarchy of Web sites. FIG. 1 is a pictorial diagram of an exemplary hierarchy of Web sites. Several Web pages, which have related content and are interconnected by hyperlinks, are grouped in a site 108. Each site 108 may contain multiple levels of other sites 108. Several sites 108 having the same owner and sharing administrative settings are illustrated as grouped into a site collection 110. Several site collections 110 served by a virtual server 112 are also illustrated as grouped together. Virtual servers are also known as Web Applications. Virtual servers 112 have independent access to hardware resources, such as input and peripherals devices. Virtual servers 112 also have separate domain names and IP (Internet Protocol) addresses. Several virtual servers 112 are hosted and can run on one hardware computer, such as a Web server. Several grouped together Web servers form a server farm 114. A server farm 114 is a centralized group of network servers, maintained by one organization, that provides network load balancing, scalability, and fault tolerance. Individual servers are connected together in a server farm 114 such that the server farm 114 appears to an end-user as a single computer or Web server. Typically, the Web portions below the dotted line 102, i.e., the sites 108 and collections of sites 110, are managed by customers 104, and the Web portions above the dotted line 102, i.e., the virtual servers and the Web farm, are managed by service providers 106. As a result, no single entity has control of the Web site hierarchy 100.

A Web site hierarchy, such as the one illustrated in FIG. 1 and described above, defines different scopes of operation where customization of controls is effected. For example, a custom control defined at the site collection level can also be used in sites 108 included in the site collection 110. In one exemplary embodiment, the system and method described herein include provisioning a Web page with delegate controls that act as placeholders on the Web page. Each of the delegate controls has a unique identifier. Each delegate control has an associate delegate control that performs the functions required to be performed by the type of control represented by the delegate control in the Web page. In one embodiment, the associate delegate control is a child object of the delegate control and is created by object inheritance. In another embodiment, the associate delegate control may be linked to the delegate control by pointers. In yet another embodiment, the associate delegate control may be associated with the delegate control through the use of an associative table. When a Web page containing a delegate control is requested by a user and loaded, the delegate control looks at a feature registry that contains a list of candidate controls suitable for replacing the associate delegate control. In one embodiment, the delegate control may not be initially linked with a default associate delegate control to be replaced later with a candidate control selected from the feature registry. Instead, the delegate control is initially linked with the candidate control, bypassing the step of linking the default associate control for later replacement.

Figure 2:
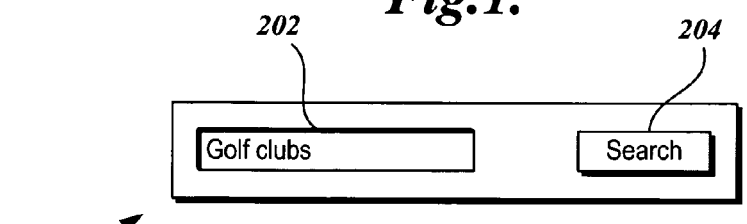
FIG. 2 is a pictorial diagram of an exemplary Web page control for a simple search.

FIG. 2 is a pictorial diagram of an exemplary Web page control 200 for a simple search. A text search box 202 is used to enter a subject matter for which the user wants to find more information. A search button 204 is used by the user to start searching for the subject matter entered in search box 202. The search control 200 is an example of a simple, standard search control that may be included in a Web page as an associate delegate control suitable for replacement by a candidate search control. In one exemplary embodiment, a feature registration system, comprising a feature registry, is used to provide candidate controls suitable for replacing an associate delegate control. The candidate controls may be provided by third party vendors and registered in the feature registration system. In one exemplary embodiment, a candidate control entry in the feature registry includes a name of the Web page control. For example, the name of the control may be a URL (universal resource locator) to the file containing the software for the control, or a descriptive title, such as "SmallSearch." The control entry in the feature registry further includes an identifier, a sequence number, and several properties of the control that may be set to default values. The identifier uniquely identifies the control, and the sequence number determines a priority for the control. For example, the candidate control with the lowest sequence number has the highest priority and replaces the associate delegate control. Properties included with each control feature registry entry define the default behavior of the control and may be set to various default values. For example, a color property defines the default color of the control and a size property defines the default size of the control when it is displayed in the Web page.

Figure 3:
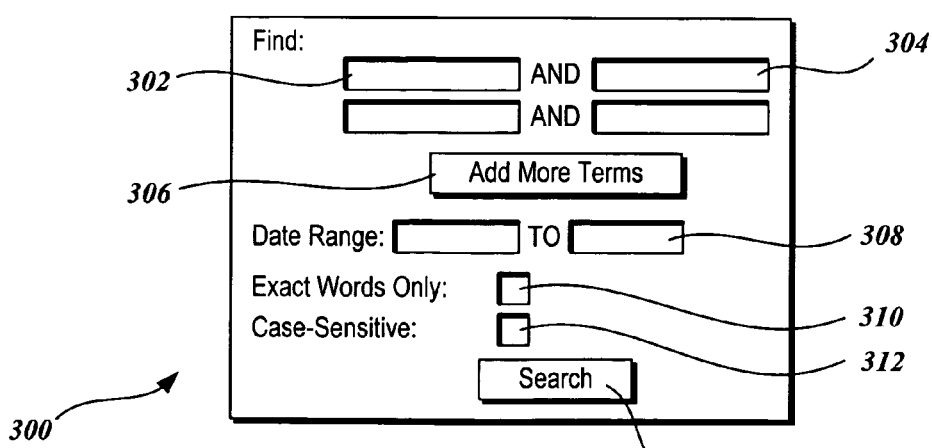
FIG. 3 is a pictorial diagram of an exemplary Web page control for an advanced search.

FIG. 3 is a pictorial diagram of an exemplary Web page control 300 for an advanced search. Search term entry boxes 302 and 304 are used to enter multiple search terms to be found according to a logical relationship between the terms, such as a logical AND or a logical OR relationship. So, instead of searching for a simple term as is done in search control 200 (FIG. 2), the search is conducted for multiple terms related in a particular logical way. A button 306 can be used to add more terms to the search. Check boxes 310 and 312 are used to further specify and limit the search using "Exact Word Only" and "Case-Sensitive" search, respectively. As discussed above with respect to FIG. 2, each candidate control entry in the feature registry has an associated sequence number that defines the priority of the candidate control. For example, the simple search associate delegate control 200 may have a sequence number of 100 and the advanced search candidate control 300 may have a sequence number of 50. When the Web page containing the simple search associate delegate control 200 is loaded and rendered, the candidate control with the lowest sequence number, that is, the highest priority, replaces the associate delegate control. The delegate control accesses the feature registry to find an appropriate candidate control to use as a replacement for the associate delegate control 200. In this example, the advanced search candidate control 300 replaces the associate delegate control 200 and is automatically displayed in the Web page. In one exemplary embodiment, if a previously used candidate control is removed from the feature registry, the Web page automatically reverts to the next highest priority candidate control or to the default associate delegate control originally included in the Web page. Using such feature registration system, a third party can replace default associate delegate controls in a Web page by entering new candidate controls in the feature registry with higher priority levels.

Figure 4:
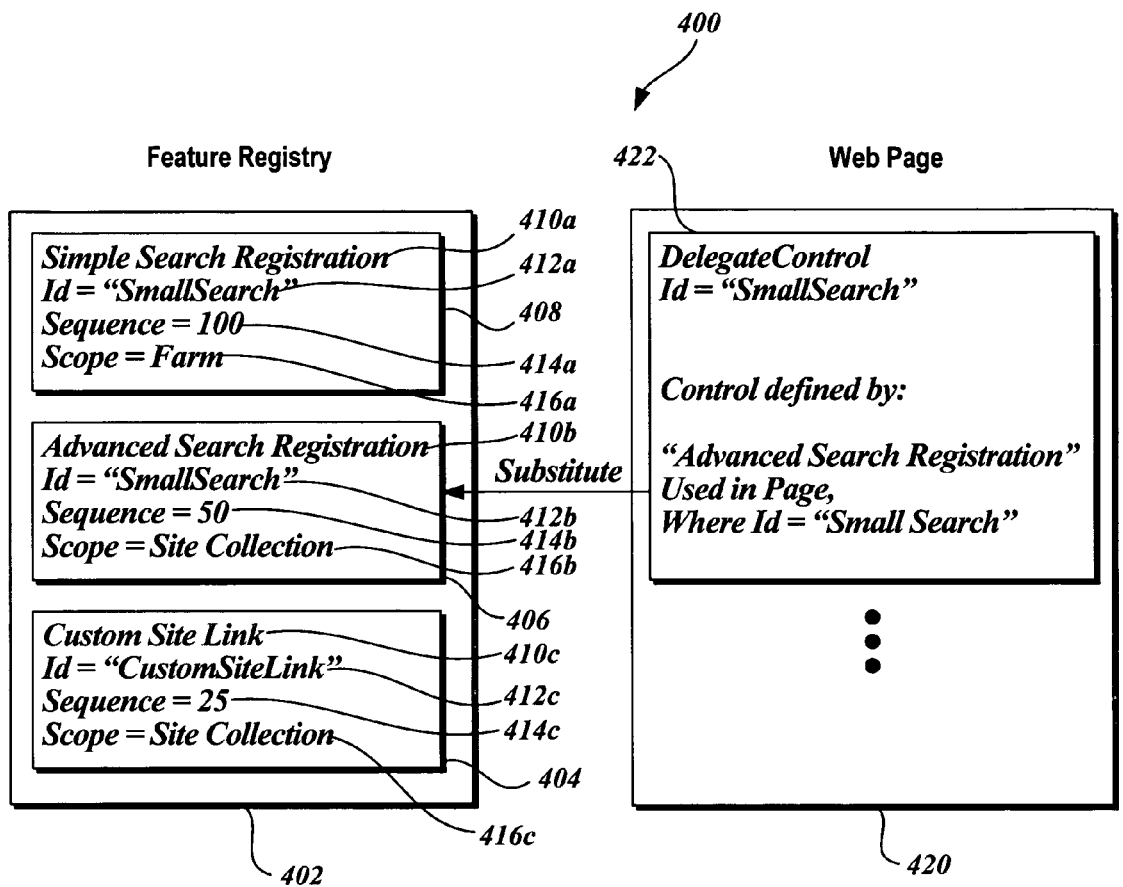
FIG. 4 is a pictorial diagram of an exemplary Web page replacing an associate delegate control from a feature registry.

FIG. 4 is a pictorial diagram of an exemplary Web page replacing an associate delegate control from a feature registry. In the illustrated exemplary embodiment, a feature registry 402 contains multiple entries 404-408 associated with candidate controls. As discussed above, each feature registry entry 404-408 includes a name 410a, 410b, 410c, an identifier 412a, 412b, 412c, a sequence number 414a, 414b, 414c, and a scope 416a, 416b, 416c. Each entry 404-408 may also have optional properties for the control (not shown in this figure; see FIG. 6). A Web page 420 including a delegate control 422 accesses the feature registry 402 to find a suitable candidate control entry 406 with the same identifier as the delegate control 422. For example, the delegate control 422 has an identifier "SmallSearch." The delegate control 422 searches the feature registry 402 to find a candidate control with the identifier "SmallSearch" that has the lowest sequence number, indicating the highest priority. In this example, the candidate control with identifier "SmallSearch" and lowest sequence number is the candidate control associated with feature registry entry 406, titled Advance Search Registration. Therefore, the candidate control associated with feature registry entry 406 is substituted for the delegate control associated with the delegate control 422, i.e., the associate delegate control, when the Web page 420 is loaded and rendered. In another embodiment, feature registry entries include scope information, which indicates the scope in which the corresponding feature registry entry may be used. For example, in a hierarchical Web site environment 100 (FIG. 1), advanced search control 300 (FIG. 3) may be in scope for some of the sites 108 included in one site collection 110, while simple search 200 (FIG. 2) may be in scope for other sites 108 included in another site collection 110. Alternatively, in Web environment 100 a candidate control may be registered with Web farm 106 scope and apply to every site 108 within the environment 100.

Figure 5:
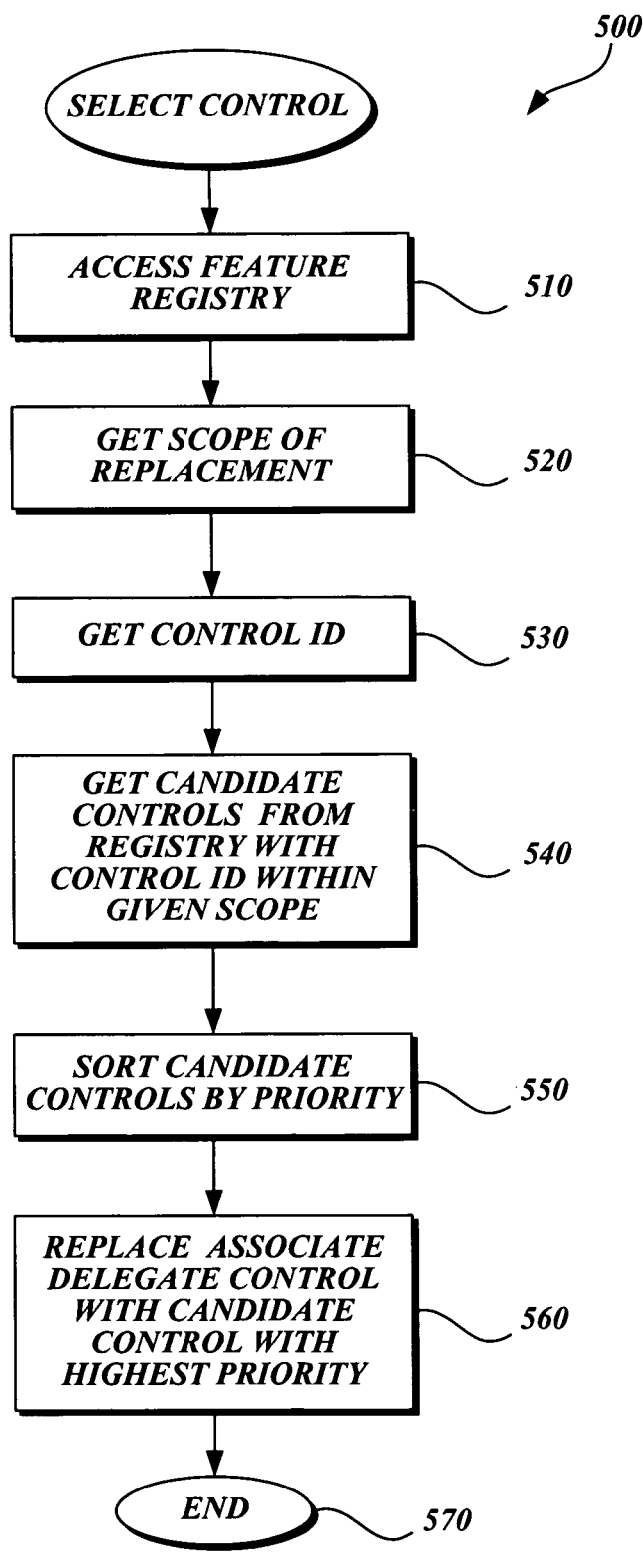
FIG. 5 is a functional flow diagram of a method of selecting a candidate control to replace the associate delegate control.

FIG. 5 is a functional flow diagram of a method 500 of selecting a candidate control to replace the delegate control. The method 500 proceeds to block 510 where the feature registry 402 is accessed. In one exemplary embodiment, the feature registry 402 resides in memory. In another exemplary embodiment, the feature registry 402 resides in a database. In yet another exemplary embodiment, the feature registry 402 comprises a file in a file system. In still another exemplary embodiment, the feature registry 402 comprises a remote file or database accessed over a network.

The method 500 proceeds to block 520, where the scope 416 of search and coverage for a candidate control is determined. For example, the feature registry 402 may be searched for a candidate control with a scope covering a site collection only. Searching a limited scope enhances system performance by limiting the number of candidate controls that are evaluated for replacement of the delegate control associated with delegate control 422, i.e., the associate delegate control. Additionally, as discussed above, scope of candidate controls 408 enables customization of individual sites and site collections by replacing only the associate delegate controls in the Web pages and Web sites that are within the desired scope.

The method 500 next proceeds to block 530, where the identifier 412 for the delegate control 422 to be replaced is obtained. For example, if the identifier of the delegate control 422 is "SmallSearch," the method 500 records the identifier 412 for further processing. In block 540, the candidate controls 408 with the same identifier 412 as the delegate control 422 that are within the desired scope are obtained from the feature registry 402. In block 550, the candidate controls 408 identified in block 540 are sorted according to priority. In one exemplary embodiment, the priority of the candidate controls 408 is determined by the sequence number 414 in the candidate controls 408. For example, a lower sequence number 414 indicates a higher priority of the candidate control 408 with which the sequence number 414 is associated. In block 560, the delegate control associated with delegate control 422, i.e., the associate delegate control, is replaced with the candidate control 408 with the highest priority. The method 500 terminates in block 570.

The method 500 provides a mechanism that allows software developers and third party vendors to replace "out of the box" Web page controls with preferred Web page controls. Additionally, as discussed above, if a third party removes a Web page control developed by the third party from the feature registry 402, the candidate control 408 with the highest priority will automatically appear in the Web Page 420 in place of the removed third party control. Upon removal of the third party candidate control 408, if the associate delegate control has higher priority than any existing candidate control 408, the associate delegate control will re-appear in the Web page 420. In other words, removing a candidate control automatically returns the Web page to an appropriate working state.

While the embodiments and examples discussed above describe controls that render visible objects on a Web page, those skilled in the art will appreciate that the delegate control can be used to dynamically replace or switch non-rendering (i.e. controls that do not render a visible object on a Web page) controls in a Web page. For example, a data source control that services other controls in the Web page by providing data from a data base or other source of data, may be replaced by another data source control with more advanced or different features.

Figure 6:
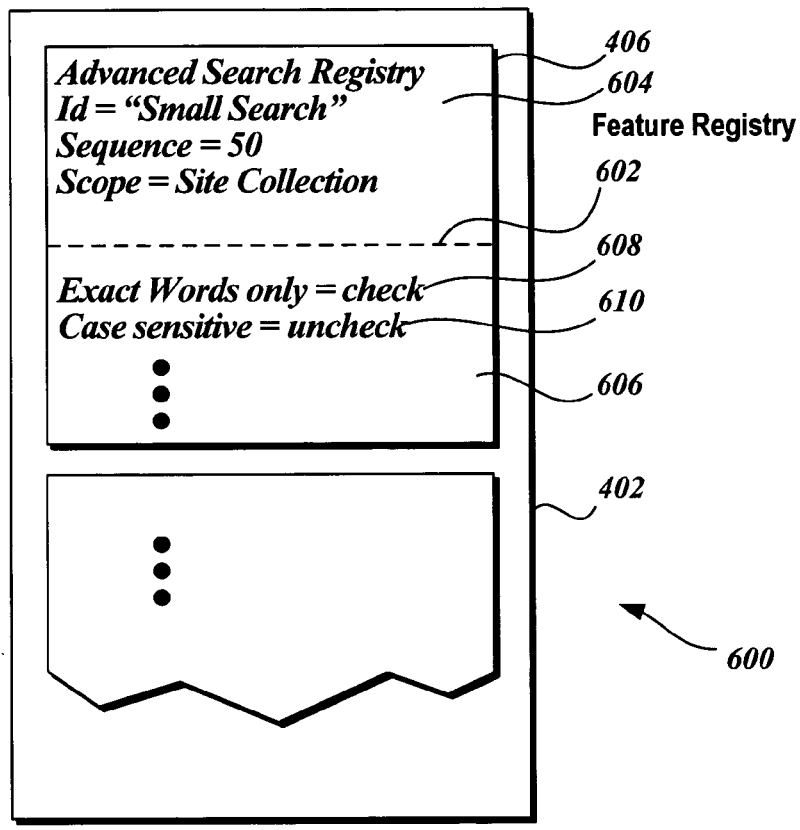
FIG. 6 is a pictorial diagram of an exemplary feature registry entry with default properties.

FIG. 6 is a pictorial diagram of an exemplary feature registry entry 600 with default properties 606 shown below dividing line 602. A candidate control 420 can have properties 608-610 that are 5 embedded in the feature registry entry 604. For example, a software developer or a third party can register a candidate control for search, such as the candidate control 300 (FIG. 3), in the feature registry 402 and include a parameter 608 to indicate that an Exact Words Only option checkbox 310 can be selected (i.e., checked) when the candidate control 300 is loaded into the Web page 420.

Figure 7:
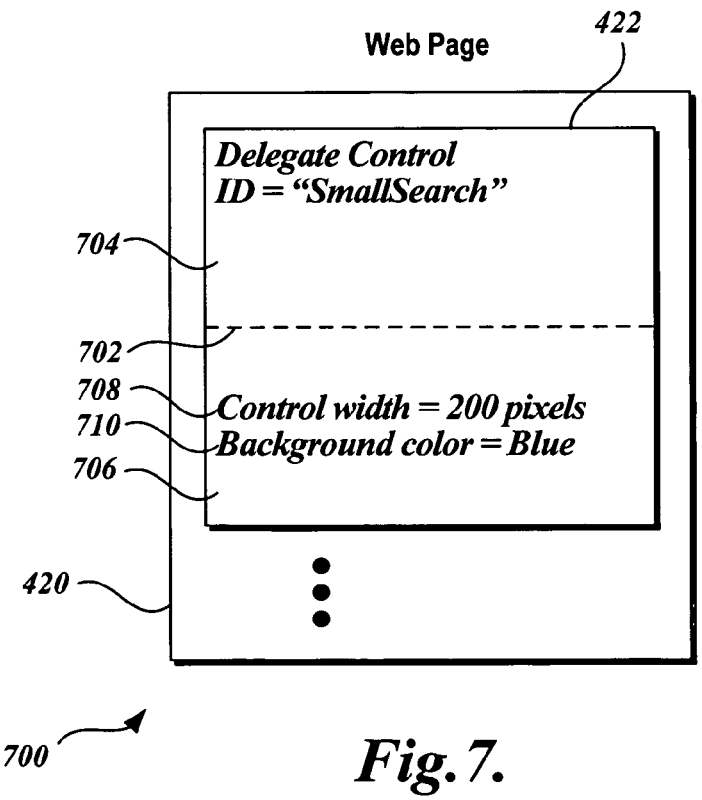
FIG. 7 is a pictorial diagram of an exemplary Web page including a delegate control and default properties embedded within the Web page.

FIG. 7 is a pictorial diagram of an exemplary Web page including a delegate control 704 and default properties 706 shown below dividing line 702 embedded within a Web page 700. Similar to FIG. 6, a candidate control 420 can have properties 708-710 that are embedded in the Web page 420. For example, a software developer or a third party can include a property 710 of a candidate control 406 to indicate a background color when the candidate control 406 is loaded into the Web page 420. When a candidate control 406 is loaded into the Web page 420, the candidate control 406 reads the property 710 from the Web page 420 and sets the background color accordingly. The specification of candidate control properties 708-710 at the Web page level allows a candidate control 406 to comply with Web page level requirements.

While the presently preferred embodiment of the invention has been illustrated and described, it will be appreciated by those skilled in the art that various changes can be made therein without departing from the spirit and scope of the invention. For example, while the systems and methods described above are directed towards Web page controls, the system and method may also find use in other software environments where modular software components are used. Thus, the invention should not be construed as limited to the exemplary embodiments described above.

The embodiments of the invention in which an exclusive property or privilege is claimed are defined as follows:

1. A method of replacing a delegate component associated with a delegate modular software component ("associate delegate component") at software execution time, the method comprising:

provisioning software with an associate delegate component acting as a placeholder and having a associate delegate identifier uniquely identifying a type of control performed by the associate delegate component;

analyzing, by the associate delegate component, a list of a plurality candidate modular software components in a feature registry to identify candidate modular software components having a candidate delegate identifier matching the associate delegate identifier and capable of performing functions required by associate delegate component;

determining, from the candidate modular software components identified to have a candidate delegate identifier matching the associate delegate identifier, a candidate modular software component having a configurable sequence number representing a higher priority level than other of the plurality of candidate modular software components identified to have a candidate delegate identifier matching the associate delegate identifier; and replacing the associate delegate component with the candidate modular software components having a configurable sequence number representing a higher priority level than other of the plurality of candidate modular software components identified to have a candidate delegate identifier matching the associate delegate identifier during the execution of software including execution of the candidate modular software component.

2. The method of claim 1, wherein the associate delegate component is a Web page control.

3. The method of claim 1, further comprises analyzing the feature registry to identify a candidate modular software component having a candidate scope matching an associate scope of the associate delegate component, the candidate scope and associate scope indicating an extent of use.

4. The method of claim 1, wherein the execution of the software including the delegate modular software component comprises loading a Web page.

5. The method of claim 4, wherein the plurality of candidate modular software components residing in the feature registry each occupy an entry in the feature registry.

6. The method of claim 5, wherein the delegate modular software component and each of the candidate modular software components have a plurality of configurable properties.

7. The method of claim 6, wherein the plurality of properties are included in one of a feature registry entry and a Web page that specify at least one of appearance and behavior.

8. A method of replacing a delegate component associated with a delegate modular software component ("associate delegate component") at software execution time, the method comprising:

provisioning software with an associate delegate component acting as a placeholder and having a associate delegate identifier uniquely identifying a type of control performed by the associate delegate component;

analyzing, by the associate delegate component, a list of a plurality candidate modular software components in a feature registry to identify candidate modular software components having a candidate delegate identifier matching the associate delegate identifier and capable of performing functions required by associate delegate component;

determining, from the candidate modular software components identified to have a candidate delegate identifier matching the associate delegate identifier, a candidate modular software component having a configurable sequence number representing a higher priority level than other of the plurality of candidate modular software components identified to have a candidate delegate identifier matching the associate delegate identifier and a scope; and replacing the associate delegate component with the candidate modular software components having a configurable sequence number representing a higher priority level than other of the plurality of candidate modular software components identified to have a candidate delegate identifier matching the associate identifier during the execution of software including execution of the candidate modular software component having a scope of execution within a hierarchical computing system, the scope of execution being associated with the scope of the one of a plurality of candidate modular software components.

9. The method of claim 8, wherein the associate delegate component is a Web page control and the hierarchical computing system is a hierarchical Web server.

10. The method of claim 8, wherein the priority level is a sequence number indicating priority in inverse proportion to the priority level.

11. The method of claim 8, wherein the execution of the software including the delegate modular software component comprises loading a Web page.

12. The method of claim 11, wherein the plurality of candidate modular software components reside in a feature registry, each of the plurality of candidate software components residing in the feature registry each occupy an entry in the feature registry.

13. The method of claim 12, wherein the delegate modular software component and each of the candidate modular software components have a plurality of configurable properties.

14. The method of claim 13, wherein the plurality of properties are included in one of a feature registry entry and a Web page that specify at least one of appearance and behavior.

15. A hierarchical computer system for execution of software including a delegate modular software component, the hierarchical computer system comprising:

a plurality of servers;

a feature registry used to hold a plurality of candidate modular software components;

a processing module used for:

provisioning software with an associate delegate component acting as a placeholder and having a associate delegate identifier uniquely identifying a type of control performed by the associate delegate component;

analyzing, by the associate delegate component, a list of a plurality candidate modular software components in a feature registry to identify candidate modular software components having a candidate delegate identifier matching the associate delegate identifier and capable of performing functions required by associate delegate component;

determining, from the candidate modular software components identified to have a candidate delegate identifier matching the associate delegate identifier, a candidate modular software component having a configurable sequence number representing a higher priority level than other of the plurality of candidate modular software components identified to have a candidate delegate identifier matching the associate delegate identifier and a scope; and replacing the associate delegate component with the candidate modular software components having a configurable sequence number representing a higher priority level than other of the plurality of candidate modular software components identified to have a candidate delegate identifier matching the associate delegate identifier during the execution of software including execution of the candidate modular software component, the software including the candidate modular software component having a scope of execution within a hierarchical computing system, the scope of execution being associated with the scope of the one of a plurality of candidate modular software components.

16. The system of claim 15, wherein the associate delegate component is a Web page control and the hierarchical computing system is a hierarchical Web server.

17. The system of claim 15, wherein the priority level is a sequence number indicating priority in inverse proportion to the priority level.

18. The system of claim 15, wherein the execution of the software including the delegate modular software component comprises loading a Web page.

19. The system of claim 18, wherein the plurality of candidate modular software components residing in the feature registry each occupy an entry in the feature registry.

20. The system of claim 19, wherein the delegate modular software component and each of the candidate modular software components have a plurality of configurable properties.

* * * * *